May 14, 1935.　　　O. H. BABCOCK, JR　　　2,001,595
TIRE TREAD REMOVER
Filed March 13, 1934
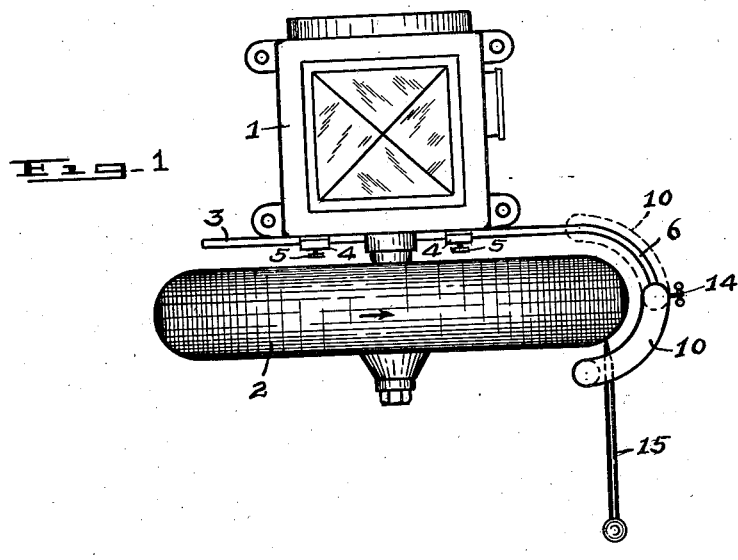
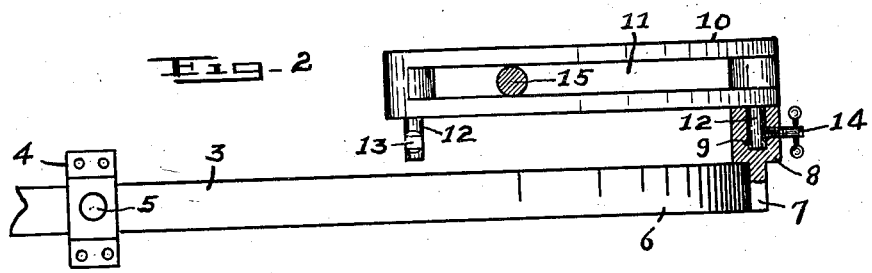
INVENTOR
Oscar H. Babcock Jr.
By Jas R Snyder
attorney Patented May 14, 1935

2,001,595

UNITED STATES PATENT OFFICE 2,001,595

TIRE TREAD REMOVER

Oscar H. Babcock, Jr., Pittsburgh, Pa.

Application March 13, 1934, Serial No. 715,383

5 Claims. (Cl. 164—38)

My invention relates to improvements in a device employed for removing the worn rubber tread of a pneumatic automobile tire, preparatory to retreading the latter in the manner well known in the art to which the invention appertains.

Important objects of the invention are to provide a tread remover of the character described, which will facilitate and expedite the tread removing operation, which obviates the necessity of reversing the position of the tire on its rotating mechanism, which embodies but few parts, and which may be conveniently operated without necessitating exceptional skill.

Further objects of the invention are to provide a device of the character stated, which is simple in its construction and arrangement, durable and efficient in its use, compact, and comparatively economical in its manufacture, operation and maintenance.

With the foregoing and other objects in view which will appear as the description proceeds, the invention resides in the novel construction, combination and arrangement of parts herein specifically described and illustrated in the accompanying drawing, but it is to be understood that the latter is merely illustrative of an embodiment of the invention, and that the needs of actual practice and manufacture may necessitate certain mechanical variations. It is therefore, not intended to limit the scope of the invention to the disclosure thereof illustrated, but rather to define such limitations in the claims hereunto appended.

In the drawing wherein like numerals of reference designate corresponding parts throughout the several views:

Figure 1 is a top plan view of a tire tread remover constructed in accordance with the invention.

Figure 2 is a side view of the invention partly in cross section and with a portion broken away.

Referring in detail to the drawing, 1 denotes a driving mechanism, which may be of any suitable construction adapted for removably supporting a tire 2 in the vertical position, and operable for rotating the latter at the proper predetermined speed, and in the clockwise direction as indicated by an arrow in Figure 1.

The present invention comprises a horizontally extending supporting bar 3 positioned flatly edgewise against that side of the driving mechanism 1 disposed adjacent to the tire 1. The supporting bar is carried by and longitudinally adjustable in a pair of spaced clips 4 fixed in position to the side of the driving mechanism. Each of the clips is provided with a set screw 5 for locking the supporting bar in the longitudinally adjusted position.

The front end portion 6, of the supporting bar 4, is laterally curved or otherwise flexed to position the end 7 thereof directly forward of the peripheral circumferential center of the tire 2 but below the horizontal diametric center of the latter.

A socket block 8 is fixed to the top of the supporting bar and 7 by means of welding or in any other suitable manner. The block extends vertically and is provided with a similarly disposed socket 9 for the purpose to be described.

An arcuate or quadrant-shaped tool rest 10 is mounted on the socket block 8. The tool rest is disposed horizontally and provided with a longitudinally extending guide slot 11, which is disposed and opens in the horizontal direction. When the tool rest is mounted in position on the socket block, the longitudinal center of the guide slot 11 is disposed approximately on the plane of the diametric center taken horizontally of the tire 2.

The rest 10 carries a pair of depending connecting pins 12, which are fixed in position at respective ends of the former. The connecting pins are adapted for insertion into the block socket 9, and each is provided with a flattened surface 13 for engagement by a locking bolt 14. The latter is threadedly mounted in the socket block 8 and operable for rigidly securing the tool rest against movement on the latter. As either of the pair of connecting pins is attachable in the block socket 9, the tool rest may readily be varied in position to dispose same at respective front sides of the tire 2, as clearly illustrated in full and in dash lines in Figure 1.

A pointed skiving or cutting tool 15 is employed for removing the tire tread. In practice, the cutting tool is extended through the guide slot 11, in the tool rest 10, and forced under one side edge of the tread of the tire 2 while the latter is rotating. After a purchase is effected under said side edge, the cutting tool is further forced forwardly under the tread until the latter is released to its greatest inner diameter. When one-half of the tire tread has been so loosed, the tool rest is changed to position same at the still attached side of the tire tread, after which the cutting tool is again employed, as set forth, to effect the release of the tire tread in its entirety. The manipulation of the cutting tool 15 to effect the tire tread removal is identical to that commonly required in the art as now practiced.

The present invention provides a most efficient device of its kind, which imparts a steadying effect to the cutting tool 15 greatly facilitating the tread removal operation, and which obviates the necessity of reversing the position of the tire 2 on the driving mechanism 1 as now required by methods in use, for the position of the tool rest 10 may be varied on the socket block 8 allowing the operation of the cutting tool from both sides of the tire tread in the manner set forth.

What I claim is:

1. A device of the character described comprising, a supporting element, a socket member carried by the latter, a quadrant-shaped tool rest provided with a slot for the reception of the cutting tool, and a pair of connecting pins fixed to and depending from the respective ends of said tool rest for connecting the latter in position to said socket member.

2. In a tire tread remover of the character described comprising a quadrant-shaped tool rest, a cutting tool, said tool rest provided with a slot for the reception of said cutting tool, a supporting element including a socket member, and depending pins carried by said tool rest for connecting either end of the latter with the socket member of said supporting element.

3. In a tire tread remover of the character described, comprising a quadrant-shaped tool rest, a cutting tool, said tool rest provided with a slot for the reception of said cutting tool, a supporting element including a socket member, depending pins carried by said tool rest for connecting either end of the latter with the socket member of said supporting element, and means for locking said tool rest against movement on said supporting element.

4. In combination, a tire tread remover of the character described comprising, a driving mechanism for supporting and rotating the tire, a horizontally extending supporting bar carried by said driving mechanism and longitudinally adjustable on the latter, said supporting bar having an end portion thereof turned outwardly to position the end of the latter at the transverse center of the tire, a socket block fixed to the top of the turned end of said supporting bar, a cutting tool, a quadrant-shaped tool rest disposed horizontally and provided with a slot for the reception of said cutting tool, and a pair of depending connecting pins fixed to respective ends of said tool rest and engaging said socket block for joining either end of said tool rest to said supporting bar.

5. In combination, a tire tread remover of the character described comprising, a driving mechanism for supporting and rotating the tire, a horizontally extending supporting bar carried by said driving mechanism and longitudinally adjustable on the latter, means for securing said supporting bar in the adjusted position, said supporting bar having an end portion thereof turned outwardly to position the end of the latter at the transverse center of the tire, a socket member fixed to the top of the turned end of said supporting bar, a cutting tool, a horizontally disposed quadrant-shaped tool rest provided with a slot for the reception of the cutting tool, a pair of depending connecting pins fixed to respective ends of said tool rest and engaging in said socket member for joining either end of said tool rest to said supporting bar, and means carried by said socket member and operable for engaging said connecting pins for securing said tool rest against movement on said supporting bar.

OSCAR H. BABCOCK, Jr.